United States Patent [19]
Garney

[11] Patent Number: 6,081,850
[45] Date of Patent: Jun. 27, 2000

[54] STORING DYNAMICALLY LOADED DEVICE DRIVERS ON A MASS STORAGE DEVICE TO SUPPORT ACCESS TO REMOVABLE COMPUTER CARDS

[75] Inventor: John I. Garney, Aloha, Oreg.

[73] Assignee: Intel Corporation, Santa Clara, Calif.

[21] Appl. No.: 08/019,798

[22] Filed: Feb. 19, 1993

Related U.S. Application Data

[63] Continuation-in-part of application No. 07/815,331, Dec. 27, 1991, Pat. No. 5,319,751.

[51] Int. Cl.[7] .................................................. G06F 15/02
[52] U.S. Cl. ............................................................. 710/15
[58] Field of Search ................................... 395/200, 275, 395/375, 650, 700, 500; 364/200, 900; 710/1, 2, 3, 8, 15, 16, 17, 18, 19, 62, 63

[56] References Cited

U.S. PATENT DOCUMENTS

| | | | |
|---|---|---|---|
| 4,589,063 | 5/1986 | Shah et al. ................................ | 364/200 |
| 5,029,077 | 7/1991 | Fatahalian et al. ...................... | 364/200 |
| 5,109,484 | 4/1992 | Hughes et al. ........................... | 395/200 |
| 5,109,510 | 4/1992 | Baker et al. .............................. | 395/650 |
| 5,247,682 | 9/1993 | Kondou et al. .......................... | 395/700 |
| 5,291,585 | 3/1994 | Sato et al. ................................ | 395/700 |
| 5,302,947 | 4/1994 | Fuller et al. ........................ | 340/825.34 |
| 5,307,491 | 4/1994 | Feriozi et al. ........................... | 395/700 |
| 5,317,695 | 5/1994 | Celi, Jr. ................................... | 395/275 |
| 5,325,532 | 6/1994 | Crosswy et al. ......................... | 395/700 |
| 5,339,432 | 8/1994 | Crick ........................................ | 395/700 |
| 5,359,713 | 10/1994 | Moran et al. ........................... | 395/200 |
| 5,386,567 | 1/1995 | Lien et al. ............................... | 395/700 |
| 5,404,524 | 4/1995 | Celi, Jr. ................................... | 395/700 |

OTHER PUBLICATIONS

Device Driver 'stubs' Smooth Path to Top SCSI Performance, by Gibson, Steve, Nov. 19, 1990.

Kyle, Jim, "Loading Device Drivers from the DOS Command Line," Dr. Dobb's Journal, v. 16, n. 11, p. 30, Nov. 1991.

Todd, Giles, "Installing MS–DOS Device Drivers From the Command Line," EXE, v.4, n.3, p. 16, Aug. 1989.

Shinichi Tamada et al., Japanese Application No. 02–169564, Assignee: NEC Corporation, et al., filed Jun. 27, 1990.

Primary Examiner—Moustafa M. Meky
Attorney, Agent, or Firm—Blakely, Sokoloff, Taylor & Zafman LLP

[57] ABSTRACT

Device drivers for removable system resources are stored on a mass storage device to provide dynamic device driver configuration for a computer system. By storing device drivers on a mass storage device, the device drivers need not be stored on their associated feature card and they can be easily updated as changes are required. The computer system comprises a processor, a system memory, a mass storage memory and an interface for receiving removable system resources (generally denoted feature cards or cards). Each feature card has a card information structure (CIS) area. The CIS includes one or more card identification fields that each hold a card identifier. The card identifier is the same for every feature card of a particular type, but it is unique for each different type of feature card. The mass storage device of the computer system has a lookup table which uses the card unique identifiers to map each type of feature card that will be used by the system to an associated device driver for controlling the feature card. Each device driver is stored on the mass storage device. The device driver for a particular feature card is copied into computer system memory upon insertion of the feature card into the computer system. The device driver may then be activated by the processor.

20 Claims, 15 Drawing Sheets

DEVICE DRIVER INFORMATION
BLOCK (DDIB) HEADER

DEVICE DRIVER LOOKUP TABLE 420

| CARD 1 IDENTIFICATION 421 | DDIB 1 ADDRESS 431 |
|---|---|
| CARD 2 IDENTIFICATION 422 | DDIB 2 ADDRESS 432 |
| CARD 3 IDENTIFICATION 423 | DDIB 3 ADDRESS 433 |
| ⋮ | ⋮ |
| CARD N IDENTIFICATION 424 | DDIB N ADDRESS 434 |

FIG. 4B

DEVICE DRIVER HEADER
540

| | |
|---|---|
| DEVICE DRIVER LINKAGE INFORMATION | -630 |
| DEVICE DRIVER ATTRIBUTE INFORMATION | -632 |
| DEVICE DRIVER STRATEGY OFFSET | -634 |
| DEVICE DRIVER INTERRUPT OFFSET | -636 |
| DEVICE DRIVER UNITS AND NAME | -638 |

FIG. 6C

DEVICE DRIVER DATA
542

| | |
|---|---|
| POINTER TO PREVIOUS DD BLOCK | -660 |
| POINTER TO NEXT DD BLOCK | -662 |
| ADAPTER IDENTIFICATION | -664 |
| SOCKET IDENTIFICATION | -666 |
| DEVICE DRIVER UNIQUE IDENTIFICATION | -668 |
| CARD INSERTION FLAG | -672 |
| DRIVER SPECIFIC DATA AREA | -672 |

FIG. 6D

STORING DYNAMICALLY LOADED DEVICE DRIVERS ON A MASS STORAGE DEVICE TO SUPPORT ACCESS TO REMOVABLE COMPUTER CARDS

RELATED APPLICATIONS

This application is a Continuation-in-part of U.S. patent application Ser. No. 07/815,331, now U.S. Pat. No. 5,319,751, filed Dec. 27, 1991, and entitled "Device Driver Configuration In a Computer System". The disclosure of the parent application, Ser. No. 07/815,331, now U.S. Pat. No. 5,319,751, filed Dec. 27, 1991, is hereby incorporated fully by reference.

This application is related to: U.S. patent application Ser. No. 08/007,580, now U.S. Pat. No. 5,404,494, filed Jan. 22, 1993, entitled "Fixed Size Device Driver Support Mechanism For Insertion and Removal of Removable Computer Cards"; and U.S. patent application Ser. No. 08/007,849, now U.S. Pat. No. 5,412,798, filed Jan. 22, 1993, entitled "Reusing Device Driver Stubs To Support Access To Removable Computer Cards" which are hereby incorporated fully by reference.

BACKGROUND OF THE INVENTION

1. Field of the Invention

The present invention pertains to the field of computer systems. Specifically, the present invention relates to computer systems supporting an interface to removable system resources and the control of device drivers related thereto.

2. Art Background

It is becoming increasingly important to design and build computer systems that can be dynamically configured without powering down the computer system or requiring the operating system program logic to be reset or bootstrap initialized. Dynamic configuration includes the ability to add or remove system resources or special feature capabilities while a computer system is operating. These system resources and special features include expansion memory boards, parallel or serial input/output (I/O) ports, read only memory (ROM) or flash memory expansion boards, computer network interface cards, modem cards, smart cards, or other removable system resources or special feature mechanisms.

Such removable system resources and special features are often implemented in the prior art using removable electronic feature cards adhering to the Personal Computer Memory Card International Association (PCMCIA), Sunnyvale, Calif., Release 2.0 standard. These PCMCIA feature cards generally comprise electronic microcircuits within a thin housing including a detachable multiple conductor interface with which the feature card may be removably inserted into a slot in a computer housing. Once inserted, a feature card is accessible to, and used by, the processor in the computer system. The use of feature cards allows a computer user to select specific features or resources from a variety of feature cards offered by a computer vendor. In this way, the computer user achieves the desired level of functionality without being required to purchase unnecessary resources or computer system capabilities. The overall cost of the computer system for a specific application is thereby optimized. The use of removable feature cards is particularly significant for portable computers or lap top computers where space constraints increase the need for system resource optimization. The design and use of hardware devices under the PCMCIA standard are well known in the art. It will be apparent to those skilled in the art that other implementations of removable system resources are possible.

Virtually all computer systems operate with some sort of operating system or software processing logic. The use of an operating system in a computer system is well-known in the art. The operating system is responsible for managing the processing and transfer of information between various system resources. One well known technique for managing these resources is the use of device drivers. Device drivers are software modules comprising processing logic for controlling the low level or device specific components of a particular computer system resource. For example, a device driver may be used for controlling a magnetic disk drive device coupled to a computer system. In this example, the device driver would control the various hardware specific registers, latches, signals, or other components of the magnetic disk drive device. Similarly, other computer system resources such as serial or parallel input/output (I/O) ports, modem devices, computer network interface devices, or memory expansion boards are controlled by device drivers.

In conventional computer systems, device drivers are typically loaded into random access memory (RAM) during bootstrap initialization of the computer system. Many prior art computer systems require that device drivers be loaded at initialization time in order for random access memory to be allocated properly. Depending upon the complexity of the device controlled by the device driver, the device driver itself may be relatively small or a very large device driver that consumes many thousands of bytes of random access memory. Thus, many prior art systems require that a full system configuration of resources be installed and available at bootstrap initialization time. If system resources or interfaces are subsequently added or removed from the system, the inability to access a newly installed resource or the errant access to a now unavailable system resource usually results. Other prior art computer systems require that the computer system be powered down while new system resources or features are added or removed from the system. Still other systems must at least be newly bootstrap loaded in order to gain access to a new configuration of system resources. Thus, prior art computer systems cannot be readily reconfigured to a new arrangement of system resources.

Because prior art systems typically require that a full system configuration of resources be established at initialization time, the tendency exists for any or all system resources that may conceivably be used while a computer system is powered up to be installed during the initialization process. This tendency leads to the installation of resources that are never used during a computing session. The loading and installation of unused system resources increases the time required for bootstrap initializing the system and reduces the available random access memory (RAM), because of the RAM space required by unused device drivers. It is, therefore, important to install in a computer system only those device drivers actually needed during a computing session. In some cases, it may not be possible to load all of the device drivers necessary because of the random access memory storage constraints.

Some computer systems in the prior art provide means for interfacing with removable electronic feature cards. In order to mitigate the disadvantages described above, some of these computer systems store associated device drivers on the removable electronic feature card itself. In this way, random access memory space within the computer system does not need to be allocated for storage of the device driver. Moreover, processing time during initialization is not consumed by having to load the device driver into random access memory. Systems that configure device drivers on the removable feature cards have the advantage of optimizing memory allocation requirements within the computer system.

Systems that configure device drivers on removable feature cards, however, have several important disadvantages. First, if a feature card is removed from the computer system, the device driver controlling the operation of the feature card becomes inaccessible to the computer system. In most cases, the computer system requires access to a device driver in order to properly terminate the operation of the device prior to removal of the feature card. Typically, the computer system does not have sufficient time to access the device driver prior to removal of the feature card. Thus, system errors often result from an improperly terminated system resource.

Other computer systems having means for interfacing with removable electronic feature cards provide a very limited capability for responding to insertion or removal of feature cards during post initialization operation of the computer system. Some computer systems do not recognize system resources connected to the computer system after the bootstrap initialization process has been completed. Other computer systems suspend or freeze the operation of the computer system if a system resource is removed after initialization is complete. Still other computer systems require that the system be powered down or the bootstrap initialization process be reinitiated if a new configuration of system resources is desired.

This application is a continuation-in-part of U.S. patent application Ser. No. 07/815,331, now U.S. Pat. No. 5,319,751, filed Dec. 27, 1991, and entitled "Device Driver Configuration In a Computer System". The disclosure of the parent application, Ser. No. 07/815,331, now U.S. Pat. No. 5,319,751, described a computer system having dynamic device driver configuration for removable system resources. In the computer system of the parent application, a feature card device driver is stored in a memory area of the card. The device driver is separated into two parts: 1) a full device driver portion, and 2) a stub device driver portion. The full device driver provides all of the device driver functionality necessary to control each and every function of the feature card. The device driver stub is a small compact portion of processing logic associated with the full device driver, but mainly responsible for linking the full device driver with operating system software located in the computer system.

Upon insertion of a card into the computer system, the device driver stub code image is read from the card memory area and transferred into an area of computer system memory. The device driver stub code is then executed by the processor of the computer system from computer system random access memory. Conversely, the full device driver code is not transferred to the computer system random access memory; rather, the full device driver is executed while still resident on the card. Upon execution, the device driver stub enables access to the full card resident device driver and allows memory mapping to the full device driver. The full device driver may then be activated by the processor.

When a card is removed from the computer system, the device driver stub disables access to the removed card by disallowing memory mapping to the removed card. The device driver stub is unlinked from the linked list of device driver stubs and the card insertion flag is reset to indicate that the removable system resource has been decoupled from the computer system.

However, current computer cards do not have device drivers resident in memory areas on the card. Furthermore, no current computer cards have device driver stubs resident in their memory area. Moreover, it may not be desirable to store device drivers or device driver stubs on a computer card. This is because there is an extra cost associated with placing the memory area on the card. The memory area takes up space on the card that could be used for other functionality. Additionally, if the memory area on the card is read only memory (ROM), it is not possible to change the device driver or device driver stub stored there. Such changes may become necessary to update the device drivers or their stubs as corrections are required to replace faulty or outdated processing logic. Therefore, while the invention of the parent application permits dynamic device driver configuration for removable computer system resources, in some applications the fact that the device driver and device driver stubs must be stored on the card is an undesirable feature because the device drivers and device driver stubs occupy space on the card, increase the cost of the card and cannot be easily updated.

Thus, a better means for dynamically configuring system resources in a computer system is needed.

SUMMARY OF THE INVENTION

A method and apparatus for a computer system having dynamic device driver configuration for removable system resources is disclosed. The computer system comprises a processor, a system memory, a mass storage memory and an interface for receiving removable system resources. These system resources and special features include expansion memory boards, parallel or serial input/output (I/O) ports, read only memory (ROM) or flash memory expansion boards, computer network interface cards, modem cards, smart cards, or other removable system resources or special feature mechanisms (generally denoted feature cards or cards).

A feature card includes a card information structure (CIS) area. The CIS area includes a card identification field that holds a card identifier. The card identifier is the same for every feature card of a particular type, but it is unique for each different type of feature card.

The mass storage device of the computer system has a lookup table which maps each type of feature card that will be used by the system to a memory area of the mass storage device. The memory area of the mass storage device includes software for controlling the corresponding feature card specific functionality of any feature card of the type of feature card associated with the unique card identifier. The software within the memory area, includes both data and processing logic, including a device driver for controlling the feature card. The device driver provides all of the device driver functionality necessary to control each and every function of the feature card.

The memory area of the mass storage device comprises a device driver information block (DDIB) header and device driver code. The device driver information block header comprises information used for linking the device driver with other device drivers and computer system processing logic. The device driver code image comprises processing logic and data that is copied into computer system memory upon insertion of a feature card into the computer system. The device driver may then be activated by the processor. Later, if the card is reinserted into the computer system, the device driver is then copied again into system memory if it is no longer residing there.

The DDIB header comprises a set of information for linking the card device driver in a linked list with other device drivers and with the operating system logic executing within the computer system. By traversing the linked list, a particular device driver may be located. Upon insertion of a card into a particular slot, the linked list of device drivers is traversed to determine whether the device driver already resides in the computer system memory. If so, the operation of copying the device driver into computer system memory is prevented from occurring. As a card is inserted, a card insertion flag is set to indicate that the removable system resource is coupled to the computer system.

When a card is removed from the computer system, the linked list of device drivers is traversed to find all device drivers associated with the removed card. Each associated device driver is executed. The device driver disables access to the removed card by disallowing memory mapping to the removed card. The device driver is unlinked from the linked list of device drivers and the card insertion flag is reset to indicate that the removable system resource has been decoupled from the computer system.

By storing device drivers on a mass storage device, the device drivers need not be stored on their associated feature card and they can be easily updated as changes are required.

BRIEF DESCRIPTION OF THE DRAWINGS

The objects, features, and advantages of the method and apparatus of the present invention will be apparent from the following detailed description of the invention in which:

FIG. 4b illustrates the content of the Device Driver Lookup Table.

FIG. 6c illustrates the content of a device driver header.

FIG. 6d illustrates the content of the device driver data area.

DETAILED DESCRIPTION OF THE INVENTION

The present invention is a computer system having a method and circuitry for dynamically configuring device drivers of removable system resources. In the following description, numerous specific details are set forth in order to provide a thorough understanding of the present invention. However, it will be apparent to one of ordinary skill in the art that these specific details need not be used to practice the present invention. In other circumstances, well known structures, circuits, and interfaces have not been shown in detail in order not to obscure unnecessarily the present invention.

Figure 1:
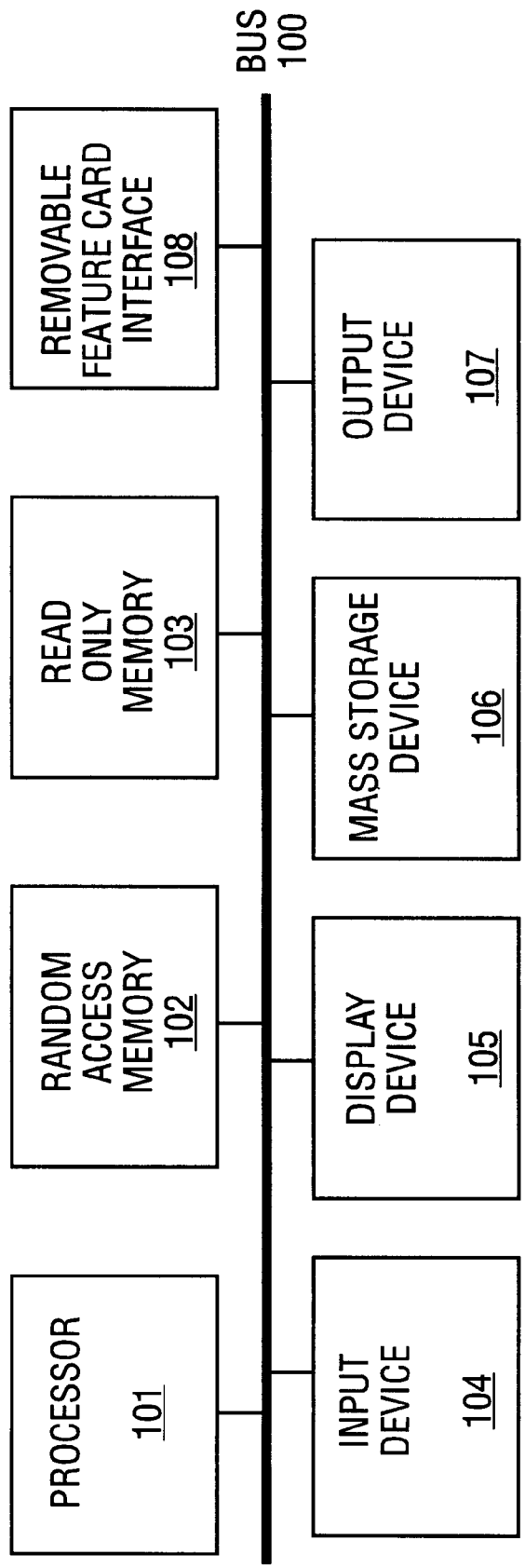
FIG. 1 is a block diagram of the architecture of a computer system in which the present invention operates.

Referring now to FIG. 1, a block diagram of the computer system is illustrated in which the present invention operates. It will be apparent to those of ordinary skill in the art, however, that alternative computer system architectures may be employed. In general, such computer systems as illustrated by FIG. 1 comprise a bus 100 for communicating information, a processor 101 coupled with the bus 100 for processing information, a mass storage device 106 such as a magnetic disk and disk drive coupled with the bus 100 for storing information and instructions, a removable electronic feature card interface 108 for electrically removably coupling an electronic circuit card to bus 100, and a random access memory device 102 coupled with the bus 100 for storing information and instructions for processor 101. The processing logic of the present invention is typically stored in a device such as random access memory 102 and executed therefrom by processor 101. The mass storage device 106 stores a device driver for each type of feature card that will be used by the system, as well as a lookup table that maps the device driver for a type of feature card to a feature card type unique card identifier stored on the feature card.

In addition, a typical computer system may optionally include other system resources including a read only memory device 103 coupled with the bus 100, an input device 104 such as an alphanumeric input device or a cursor control device coupled to the bus 100 for communicating information and command selections to the processor 101, a display device 105 such as a video display terminal or a liquid crystal display device coupled to the bus 100 for displaying information to a computer user and an output device 107 such as a printer or facsimile apparatus coupled to the bus 100 for communicating information to a destination external to the computer system.

Removable feature cards which may be removably inserted into interface 108 generally comprise electronic microcircuits within a thin housing including a detachable multiple connector interface with which the feature card may be removably inserted into a slot in a computer system housing. In one embodiment, the feature cards and feature card interface 108 used with the present invention adhere to the PCMCIA release 2.0 standard for electronic feature cards. Feature cards of this form are well known to those of ordinary skill in the art.

Figure 2:
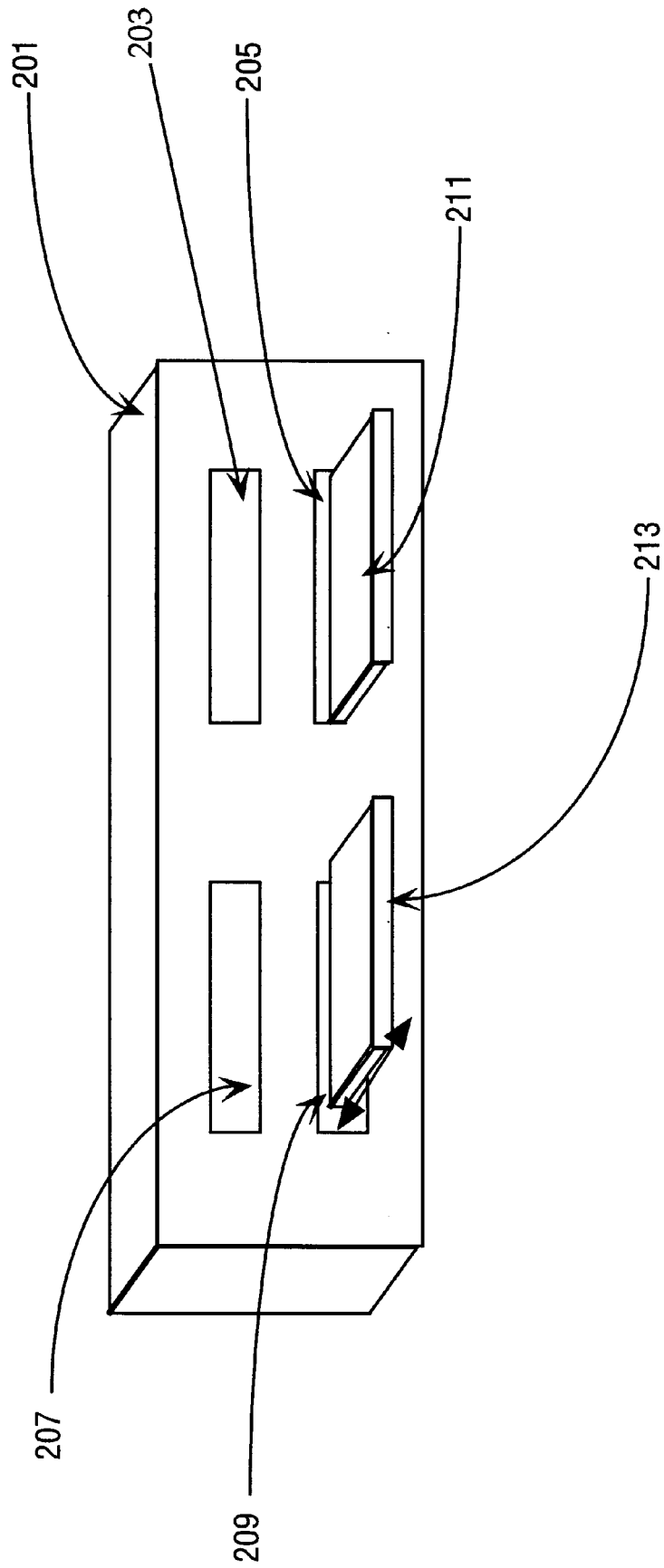
FIG. 2 is an example of a computer housing containing a plurality of feature card insertion slots.

Referring now to FIG. 2, an illustration of a computer system housing having a plurality of feature card interfaces (203, 205, 207, and 209) is illustrated. As shown, feature cards 211 and 213 may be removably inserted and thereby electrically coupled to an interface 108 within the computer system. This feature card structure facilitates the convenient insertion and/or removal of feature cards during the course of a computing session.

Figure 3:
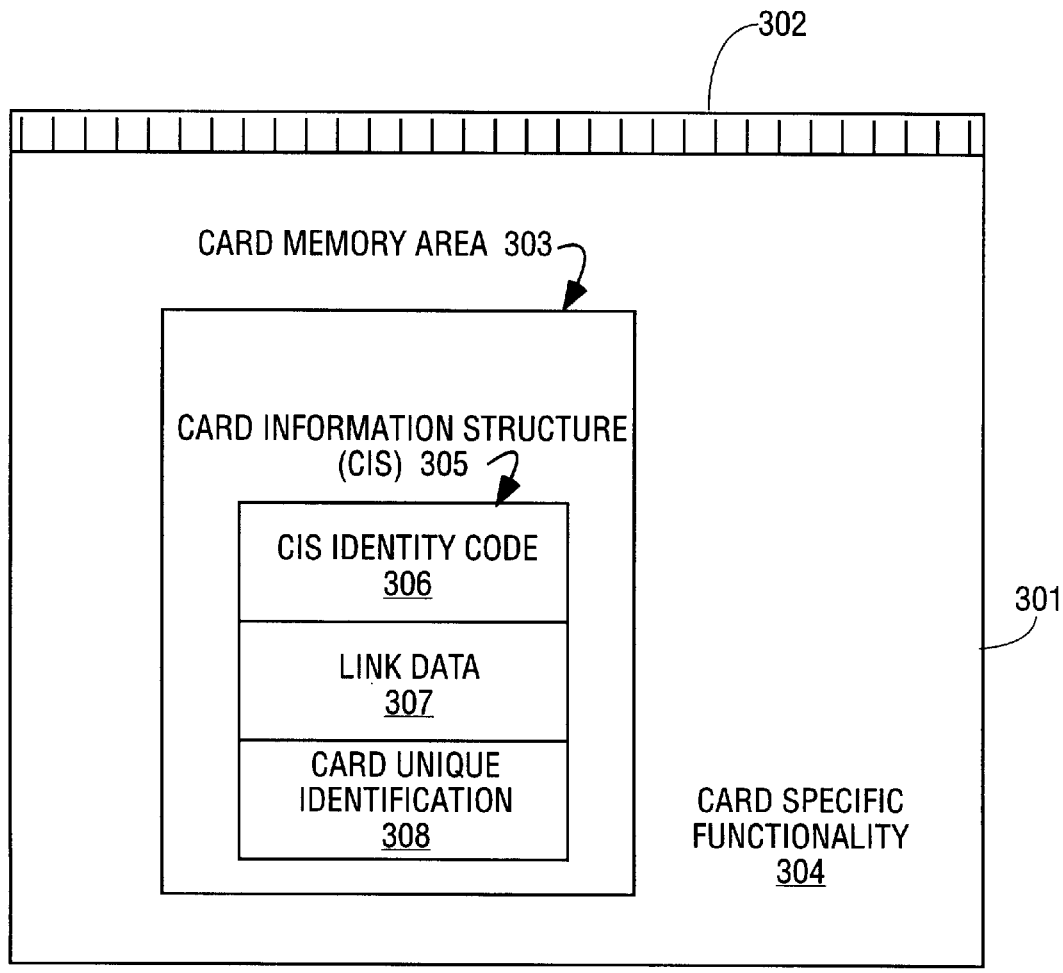
FIG. 3 is a block diagram of the contents of a removable electronic feature card.

Referring now to FIG. 3, the structure of a typical feature card 301 is illustrated. Feature card 301 includes an interface 302 with which the feature card 301 may be removably electrically coupled to a computer system. Feature card 301 also includes a card memory area 303. Card memory area 303 includes a card information structure (CIS) 305. CIS 305 includes a CIS identity code 306, link data 307 and a card unique identification 308. CIS identity code 306 and link data 307 are used to recognize the feature card 301. As will be explained below in greater detail, card unique identification field 308 contains a card identifier which is used by a device driver loader to locate the device driver for the card. The device driver provides all of the device driver functionality necessary to control each and every function of the feature card. The card unique identification field 308 contents must be different for every type of feature card in a system. However, if two feature cards in the system may use the same device driver, then they may have the same card unique identification field 308 contents. It is also possible for there to be more than one card identifier and device driver for a given card.

There are several ways to ensure that the contents of a card unique identifier field 308 for a particular type of feature card is unique. One way would be to provide a clearing house which would catalog device driver identification codes. When a new feature card was designed that required a new device driver, the designer would apply for an unassigned (and therefore unique) identifier from the clearing house.

However, the requirement for uniqueness of identifiers is only for all feature cards that will be used in a particular system. Therefore, in an alternate embodiment where the system can modify the contents of card unique identification field 308, a processor within the system assigns system unique identifiers to new cards and device drivers as they are added to the system.

In order to avoid the problems encountered in the prior art, the feature card device driver of the present invention is stored on a mass storage device and loaded into computer system memory by the device driver loader when the card is inserted into a socket of the computer system. Using this technique, memory space within the feature card need not be provided for the card device driver. Furthermore, maintaining the card device driver on the mss storage device achieves the advantage of permitting the device driver to be easily modified as needed.

In the present invention, a fixed amount of system memory RAM is set aside at bootstrap initialization to contain the device drivers. Device drivers corresponding to removed cards remain resident in system memory. Therefore, by allocating enough space in computer system memory to contain every device driver for the cards used by the user during a given session, one can avoid having to periodically reset the system based upon insertion of a new card.

Figure 4A:
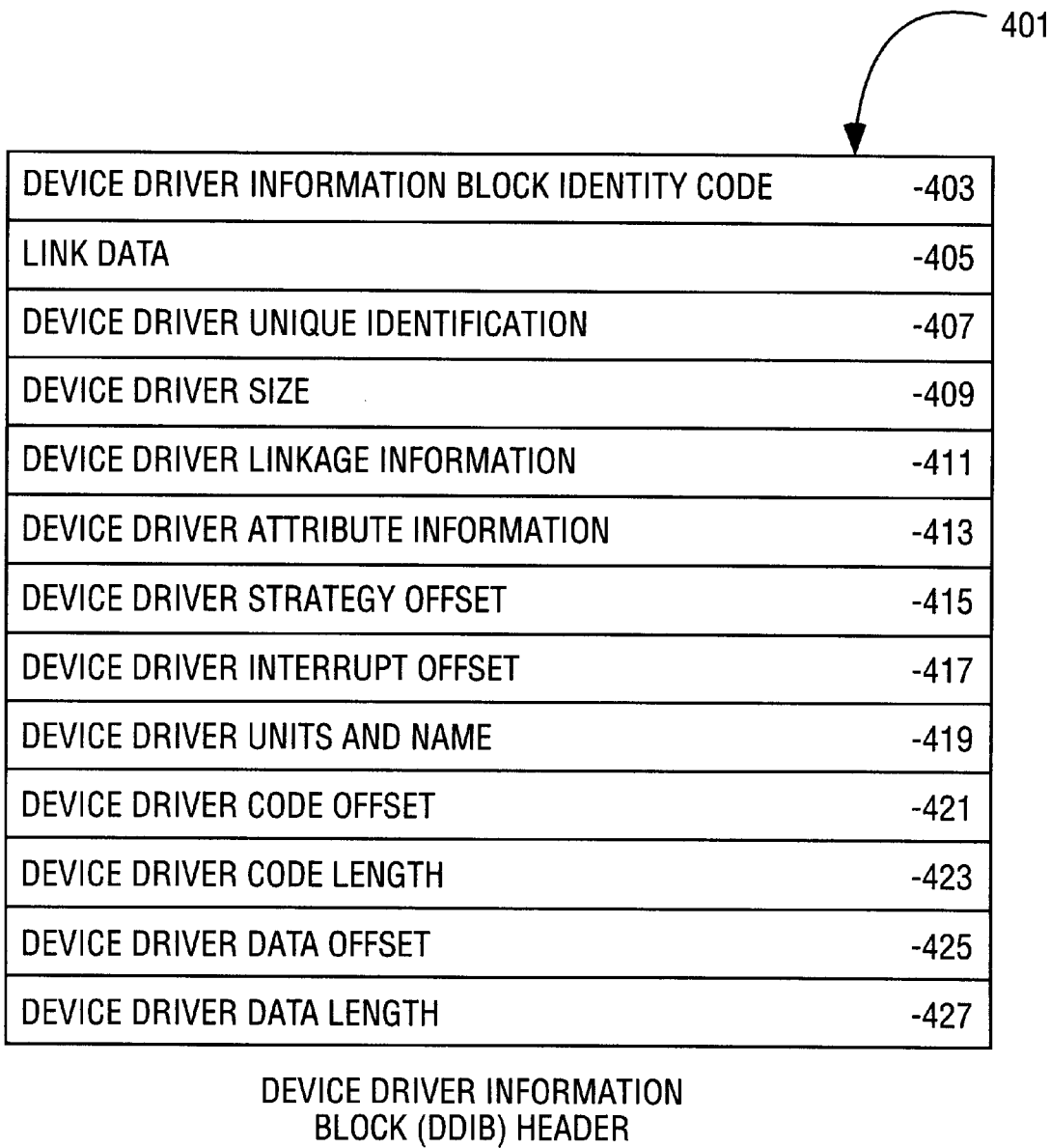
FIG. 4a illustrates the content of the Device Driver Information Block Header.

Referring now to FIG. 4a, the content and structure of the device driver information block (DDIB) header for a removable card is illustrated. DDIB header 401 is stored on mass storage device 106 and comprises a set of information for linking the card device driver with operating system logic executing within the computer system.

DDIB header 401 comprises a device driver information block identity code 403 that identifies the remaining information as being part of a DDIB header. Link data field 405 is used for linking the DDIB with other DDIBs (not shown) in the mass storage memory area 106. Device driver unique identification 407 is a unique value that identifies the device driver and distinguishes the device driver from all other device drivers. Device driver size 409 specifies the size of a RAM data area required by this device driver.

The next five DDIB header fields (i.e. fields 411, 413, 415, 417, and 419) are all the same values contained within a standard operating system device driver header. Specifically, these five parameters are contained within the DOS (Disk Operating System developed by Microsoft, Corp., Redmond, Wash.) device driver header which is well known to those of ordinary skill in the art. Device driver linkage information 411, device driver attribute information 413, and device driver units and name 419 comprise device driver identification and linkage information used by the operating system to identify and link with the corresponding device driver. The device driver strategy offset 415 and device driver interrupt offset 417 contain the offset from the beginning of the device driver code area. These fields are modified by the operation of the present invention as will be described below. Device driver code offset 421 and device driver code length 423 provide a means by which the computer system processing logic may determine the location and size of the device driver code segment resident on the mass storage memory device. Similarly, device driver data offset 425 and device driver data length 427 provide a means for determining the location on the mass storage device and the size of the device driver data area. Knowing the location and size of the code and data areas for the device driver, operating system logic within the computer system can transfer the device driver code and data areas from the mass storage memory device into computer system random access memory.

Referring now to FIG. 4b, device driver lookup table 420 is illustrated. Device driver lookup table 420 is stored on mass storage device 106 and is comprised of several sets of card identification and device driver identification block (DDIB) address fields. There is one set of card identification and device driver identification block (DDIB) address fields for every type of feature card that will be used by the computer system. Thus, in a computer system that will have N possible types of feature cards, there will be N sets of card identification and device driver identification block (DDIB) address fields denoted 421–424 and 431–434, respectively.

When a feature card has been inserted into a socket of the computer system, the device driver loader reads the card unique identification 308 (FIG. 3) from the card and then searches through the device driver lookup table until it locates a card identification field that matches the card unique identification 308. The DDIB address field that corresponds to the matching card identification field points to the address on the mass storage device of the DDIB for the type of feature card that was loaded.

Thus, if the card unique identification 308 matches the card 3 identification field 423 of device driver lookup table 420, the device driver loader would determine that the DDIB for the feature card was stored on the mass storage device 106 at the address stored in DDIB 3 address field 433.

When a new feature card is added to the system for the first time, there must be a way for the device driver and its DDIB header to be copied onto the mass storage device and a corresponding unique identifier, DDIB address pair to be added to the device driver lookup table. The amount of system main memory to set aside for device drivers may have to be increased to accommodate the new device driver.

Similarly, if a device driver for a feature card is updated, it is desirable to provide a way for the new device driver and its DDIB header to be copied onto the mass storage device in place of the old ones. The corresponding unique identifier, DDIB address pair of the device driver lookup table may also need to be revised. The amount of system main memory to set aside for device drivers may have to be changed to accommodate the new device driver.

When a feature card is to be retired from the system, it is also desirable to provide a way for the device driver and its DDIB header to be erased from the mass storage device and the corresponding unique identifier, DDIB address pair to be removed to the device driver lookup table. The amount of system main memory to set aside for device drivers may also be decreased to accommodate for the removed device driver.

There are many ways well known to those skilled in the art in which device drivers, DDIB headers and device driver lookup table entries may be revised as new cards are added to the system, old cards are removed from the system or device drivers for feature cards are updated. One way would be for the new device driver and an executable installation file to be supplied on a floppy disk. Executing the installation file from the floppy disk would cause the device driver and associated header to be copied onto the mass storage device and the device driver lookup table to be updated. The executable file could also have an option for removing the device driver and DDIB header from the mass storage device and deleting the corresponding unique identifier, DDIB address pair from the device driver lookup table. In an alternate embodiment, the installation file, device driver and DDIB header could be supplied to the system via an alternate input/output device such as a local area network or modem.

It will be obvious to one of ordinary skill in the art that while DDIB address fields 431–434 have been described above as containing the address of the location of a DDIB, the field need not contain an address, per se. The lookup table can employ techniques well known in the art for mapping the card unique identification 308 to its corresponding DDIB. Thus, for example, the DDIB address field 431 could contain the name of a file containing the DDIB header, rather than the address of the DDIB header. In fact, the lookup table could contain all of the DDIB header information and then point directly to the location on the mass storage device of the device driver.

Furthermore, it will be obvious that the device driver lookup table 420 could include other fields that contain additional information. Thus, for example, an additional field could contain a detailed error message which would be generated if the DDIB header was not found at the memory address where it should be stored.

Moreover, the lookup table need not be stored on the mass storage device, per se. Instead, an initialization file could load the lookup table into main memory when the system is bootstrap initialized.

Figure 5:
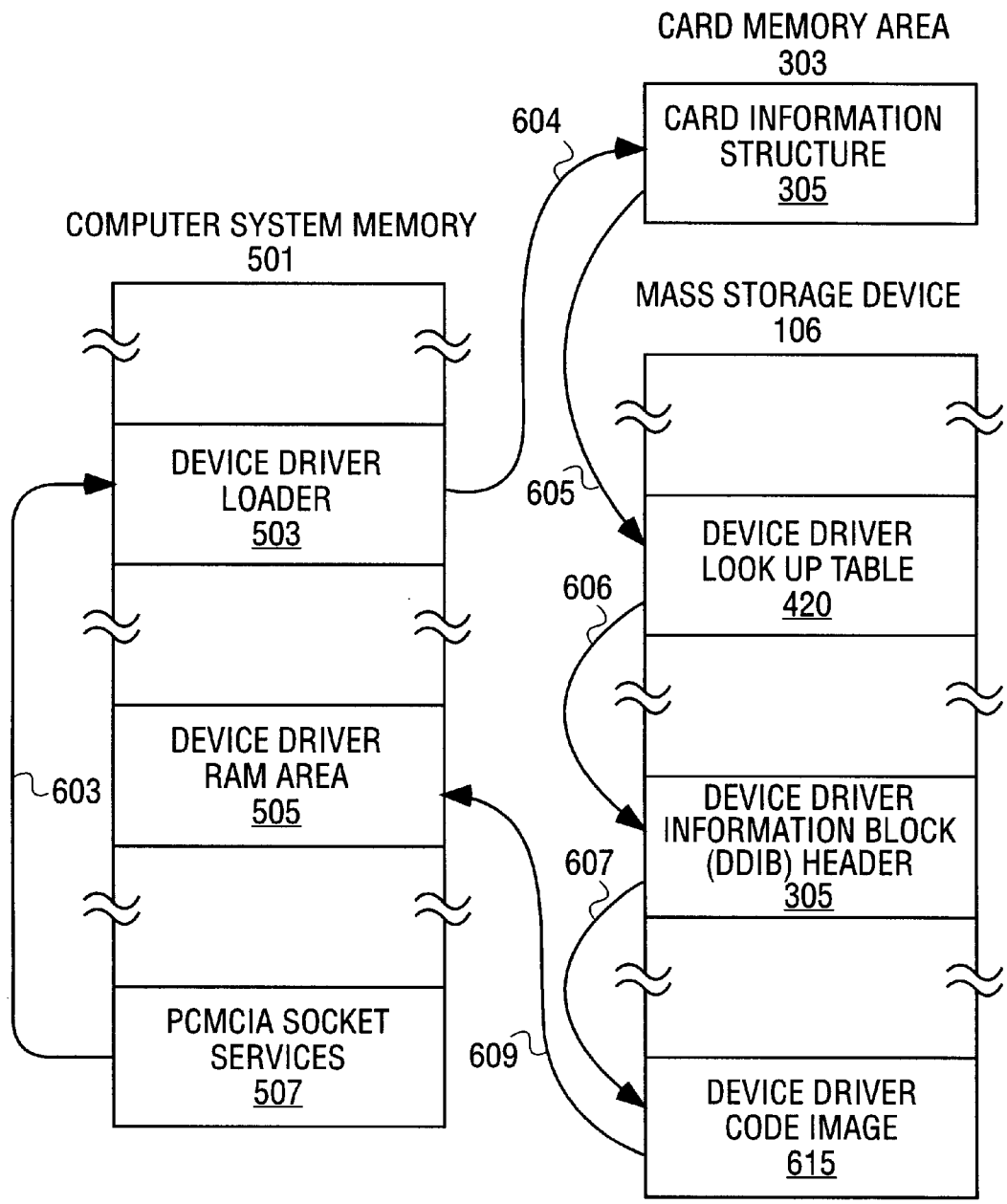
FIG. 5 illustrates the content of computer system memory as related to the content of the feature card memory and the mass storage device.

Referring now to FIG. 5, a portion of computer system memory 501 residing within random access memory 102 is illustrated. Computer system memory portion 501 comprises device driver loader 503, device driver RAM area 505, and PCMCIA socket services 507. Device driver loader 503 comprises processing logic for loading and dispatching the appropriate device driver on initialization of the computer system and when a card is inserted or removed (i.e. a card insertion or removal event) from the computer system. The details of the processing performed by the device driver loader 503 of one embodiment of the invention is described in more detail in connection with the flow charts of FIGS. 7 and 8. Device driver RAM area 505 comprises a memory area used for the storage of device drivers that are either loaded during computer system initialization time or loaded upon the insertion of a card into the computer system. The content of device driver RAM area 505 is described in more detail in connection with FIGS. 6a and 6b. PCMCIA socket services 507 comprises processing logic for handling low level control of card insertion and removal events. Processing logic within PCMCIA socket services 507 receives interrupts upon the detection of a card insertion or removal event. Processing logic corresponding to the function carried out by PCMCIA socket services 507 is well known to those of ordinary skill in the art.

Also illustrated in FIG. 5 is card memory area 303 as described above in connection with FIG. 3 and mass storage device 106. Card memory area 303 comprises card information structure 305. Mass storage device 106 comprises a device driver lookup table 420 and at least one DDIB header 305 and corresponding device driver code image 615.

Upon a card insertion event, PCMCIA socket services 507 receives an interrupt and initially responds to the card event. PCMCIA socket services 507 activates device driver loader 503 as indicated by line 603 in FIG. 5. Upon activation of device driver loader 503, PCMCIA socket services 507 provides device driver loader 503 with an identification of the socket adapter and socket for which the card event interrupt was received. Device driver loader 503 then accesses the CIS area 305 on the newly inserted card as indicated by line 604. By accessing the CIS 305, device driver loader 503 gains access to the card information described above in connection with FIG. 3. Specifically, device driver loader 503 reads the card unique identification field 308 of CIS area 305. Using this information, device driver loader 503 can access the mass storage device to find the proper card unique identification entry of device driver lookup table 420 as indicated by line 605. The card unique identification entry of device driver lookup table 420 in turn contains a DDIB address. The DDIB address points to the DDIB header 305 for the inserted card as indicated by line 606 thereby permitting the device driver loader 503 to read the DDIB header 305.

Specifically, device driver loader 503 reads the device driver unique identification 407, device driver code offset 421, device driver code length 423, device driver data offset 425, and device driver data length 427. Using this information, device driver loader 503 determines where in mass storage memory device 106 the device driver code image 615 resides. Once the location and size of device driver code image 615 is determined, as indicated by line 607, device driver loader 503 copies the contents of device driver code image 615 from mass storage memory device 106 into a portion of device driver RAM area 505 as indicated by line 609 in FIG. 5. The device driver code image 615 is linked into a linked list of device drivers maintained by device driver loader 503. The manner in which the device drivers are linked by device driver loader 503 is described in connection with FIGS. 6a and 6b.

Figure 6A:
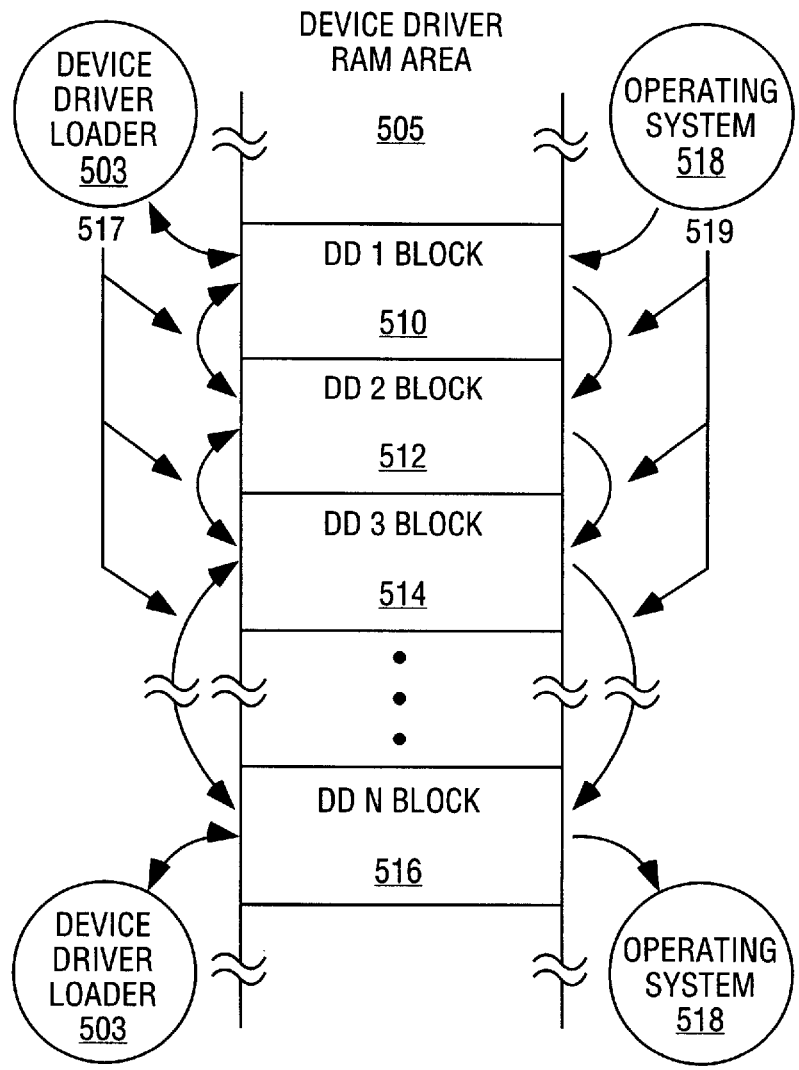
FIG. 6a illustrates the content of the Device Driver RAM Area.

Referring now to FIG. 6a, the device driver RAM area 505 is illustrated. Device driver RAM area 505 comprises memory storage area for a plurality of device driver blocks. By way of example, FIG. 6a illustrates device driver (DD) 1 block 510, DD 2 block 512, DD 3 block 514, and DD n block 516. It will be apparent to those skilled in the art that any number of device driver blocks from 0 to n may reside within device driver RAM area 505. It will be also apparent to those skilled in the art that the number of DD blocks within device driver stub RAM area 505 dynamically changes throughout the usage of the computer system as cards are added and removed. Thus, the device drivers do not need to be fixed in memory at bootstrap initialization time.

Figure 6B:
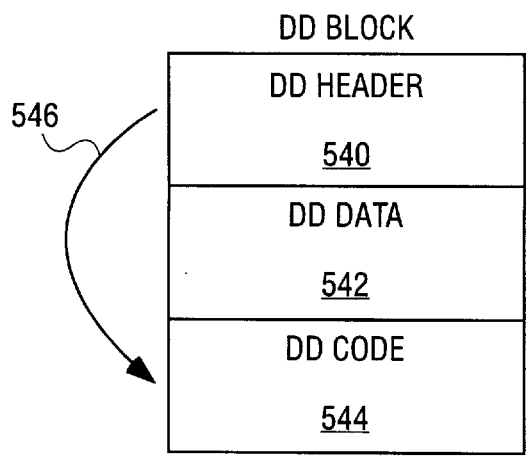
FIG. 6b illustrates the content of a device driver block.

The device driver blocks within device driver stub RAM area 505 are each composed of three components. Referring now to FIG. 6b, the three components of each device driver block of device driver RAM area 505 is illustrated. Each device driver block comprises a device driver header 540, device driver data 542, and device driver code 544. Device driver header 540 is used mainly by operating system logic that controls the operation of the computer system.

Referring now to FIG. 6c, the content of device driver header 540 is illustrated. Device driver header 540 comprises device driver linkage information 630, device driver attribute information 632, device driver strategy offset 634, device driver interrupt offset 636, and device driver units and name 638. The computer system memory 102 resident device driver information 630, 632, 634, 636, and 638 of the device driver header 540 corresponds to the device driver information 411, 413, 415, 417 and 419 (FIG. 4*a*) of the mass storage memory device 106 resident DDIB header. The DDIB device driver information is transferred to the device driver header 540 when a device driver is loaded.

Device driver linkage information 630, device driver attribute information 632, and device driver units and name 638 comprise device driver identification and linking information used by the operating system to identify and link with the corresponding device driver. Device driver linkage information 630 is used by the operating system to create a forward linked list of device drivers as illustrated by lines 519 in FIG. 6*a*. Using the device driver linkage information 630, the operating system 518 may access each device driver in the linked list by traversing down the list using the device driver linkage information of each device driver block until the last device driver block points back to the operating system 518. Device driver header 540 also includes a device driver strategy offset 634 and a device driver interrupt offset 636 which are used to identify the entry point to device driver code 544 as illustrated by line 546 in FIG. 6*b*.

Referring now to FIG. 6*d*, the content of device driver data 542 is illustrated. Device driver data 542 comprises pointers 660 and 662 that are used by device driver loader 503 for creating a forward and backward linked list of device driver blocks within device driver RAM area 505. Pointer 660 is a pointer to the previous device driver block in the linked list. Pointer 662 is a pointer to the next device driver block in the linked list. This doubly linked list structure is illustrated in FIG. 6*a* by lines 517.

Continuing to refer to FIG. 6*a*, device driver loader 503 contains a pointer to the first device driver block 510 in the linked list. The pointer 662 (FIG. 6*d*) of device driver 1 block 510 points to device driver 2 block 512. Similarly, pointer 660 (FIG. 6*d*) of device driver 1 block 510 points back to device driver loader 503. In a similar manner, pointers 660 and 662 of each device driver block is used to point to the previous and next device driver in the linked list. Thus, the device drivers are forward and backward linked in a linked list. The last device driver block in the linked list (i.e., device driver n block 516), points back to device driver loader 503 to complete the doubly linked list.

Referring again to FIG. 6*d*, device driver data 542 also comprises an adapter identification 664 and a socket identification 666. Adapter identification 664 and socket identification 666 uniquely identify the computer system hardware interface with which the device driver is associated. Device driver unique identification 668, which is the same identification as the feature card resident device driver unique identification 407 illustrated in FIG. 4*a*, uniquely identifies the device driver associated with the feature card. Card insertion flag 672 is used to retain an indication of whether the card associated with the device driver is inserted or removed. Driver specific data area 674 is a memory area allocated for use by the device driver for storage of its own data.

Referring now to FIGS. 7–13, flowcharts of the processing logic used by one embodiment of the present invention are illustrated. It will be apparent to those skilled in the art that the processing logic described herein may be executed by processor 101 of the computer system.

Figure 7:
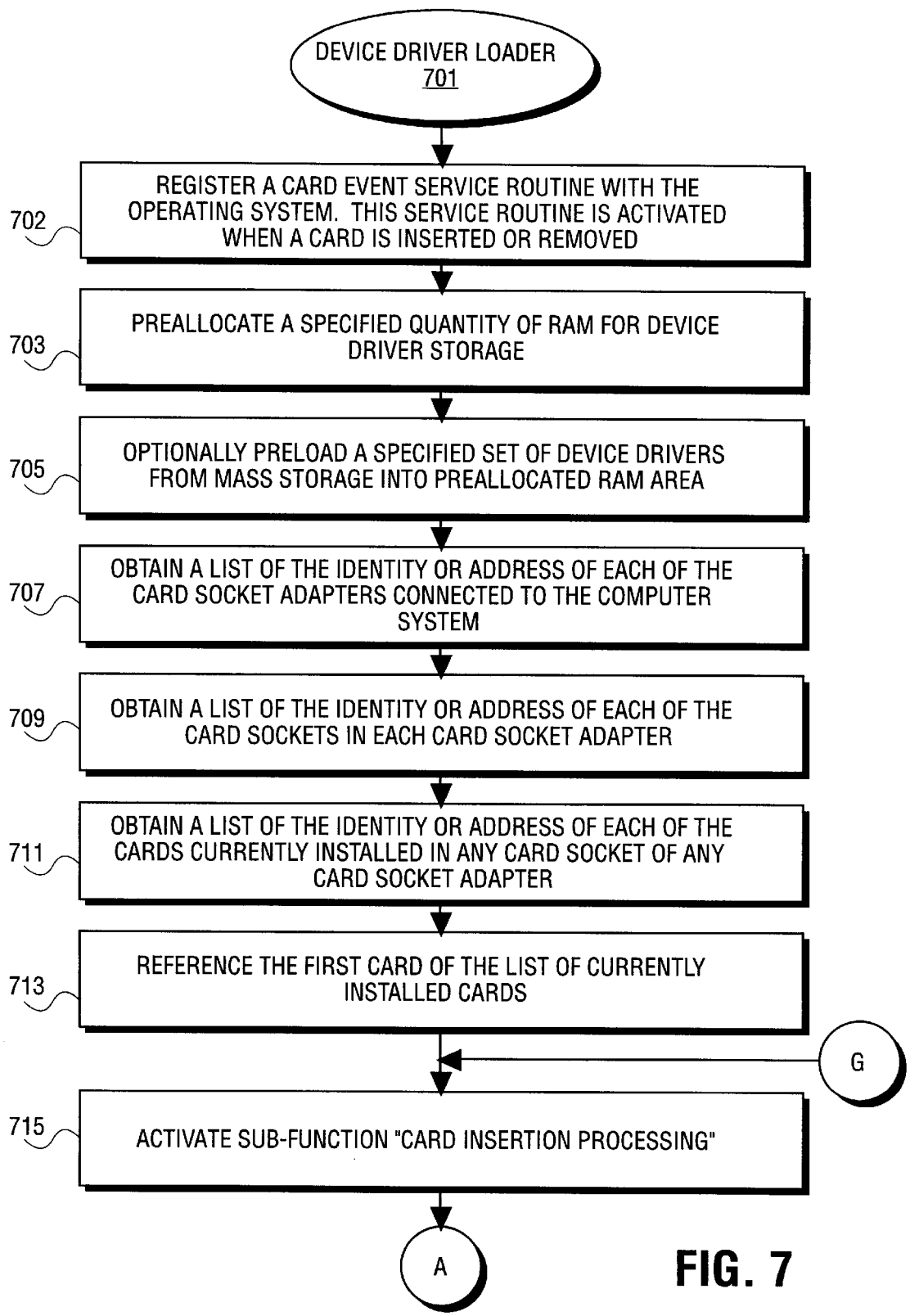
FIGS. 7–13 are flow charts illustrating the processing logic of one embodiment of the present invention.

Referring now to FIG. 7, the processing logic associated with the device driver loader 701 is illustrated. Device driver loader logic 701 corresponds to device driver loader 503 illustrated in FIGS. 5 and 6*a*. Processing logic starting at bubble 701 may be activated by the operating system at bootstrap initialization of the computer system. In one embodiment of the present invention, parameters of the device driver loader would include the size of system memory to be set aside for containing device driver blocks and the location in mass storage device 106 of device driver lookup table 420.

Upon activation of the device driver loader, a card event service routine is registered with the operating system in processing block 702. Means for registering a service routine with the operating system is well-known in the art. This card event service routine is activated upon a card insertion or removal event.

Device driver RAM area 505 is allocated in processing block 703. A predetermined quantity of random access memory 102 is allocated for the storage of device drivers in device driver RAM area 505. A set of commonly used device drivers may optionally be preloaded into the device driver RAM area 505 during initialization time in processing block 705. These initially loaded device drivers may be stored on mass storage device 106 and transferred from there into device driver RAM area 505.

Next, in processing block 707, the hardware interfaces are queried to determine the identity and address of card socket adapters that are connected and available for use within the computer system.

In a similar manner, the address or identify of each of the card sockets within each card socket adapter is determined in processing block 709. If any feature cards are currently installed in any of the available sockets of the computer system, the identity or address of the installed cards is obtained in processing block 711. The device driver loader now has a list of card socket adapters, a list of card sockets, and a list of currently installed feature cards. An index parameter is initialized to point to the first of the currently installed cards in the list of installed cards in processing block 713. A subfunction called "Card Insertion Processing" is then activated in processing block 715 to install the device driver for the currently indexed card. Subfunction "Card Insertion Processing" will be described below in greater detail in conjunction with FIGS. 10–12. After returning from the subfunction, device driver loader processing continues at the bubble labeled A as illustrated in FIG. 8.

Figure 8:
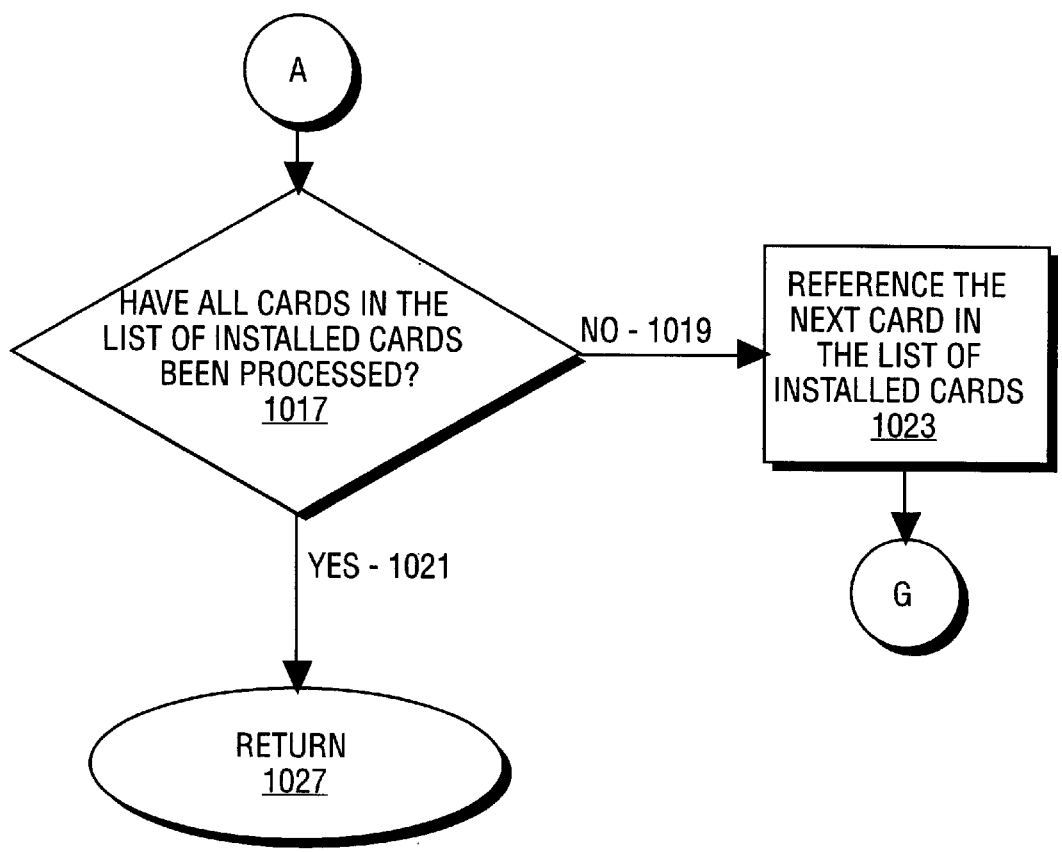

Referring now to FIG. 8, the processing for the device driver loader continues at the bubble labeled A. As the list of currently installed cards is processed, decision block 1017 is executed to determine if all cards have been processed. Once all of the cards in the list of installed cards have been processed, processing path 1021 is taken to termination bubble 1027 where processing for the device driver loader terminates. If at least one of the installed cards in the list of installed cards have not yet been processed, processing path 1019 is taken to processing block 1023 where the index into the list of installed cards is advanced to point to the next installed card and processing continues at the bubble labeled G as illustrated in FIG. 7. At the bubble labeled G, the card insertion processing subfunction is again activated for the newly indexed installed card.

Figure 9:
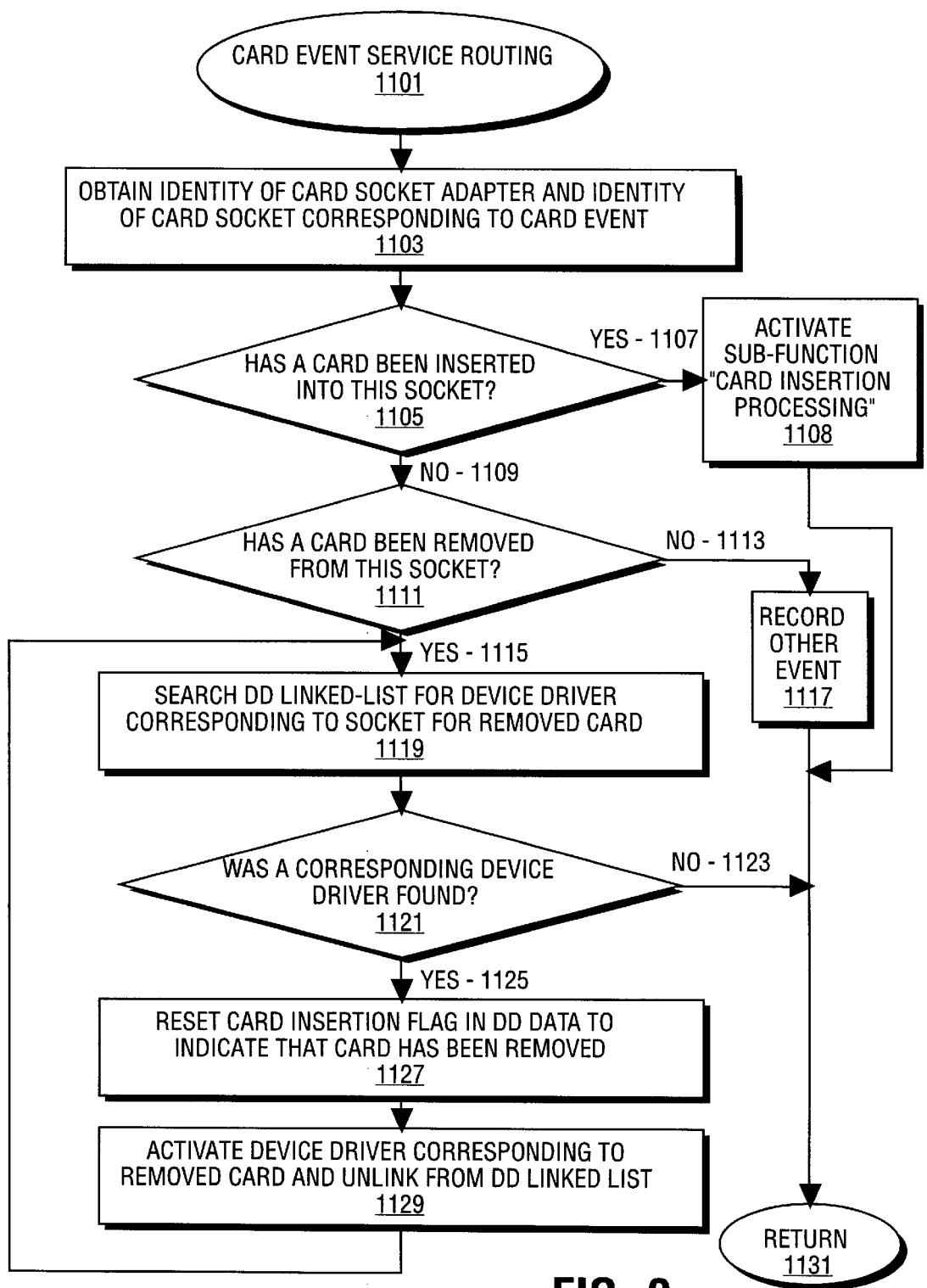

Referring now to FIG. 9, the processing for a card event service routine 1101 is illustrated. Card event service routine 1101 is a software routine registered with the operating system at bootstrap initialization of the computer system. Card event service routine 1101 is activated when a hardware event is detected by the computer system upon the insertion or removal of a feature card in any socket provided by the computer system. Upon activation of card event service routine 1101, the identity of the card socket adapter and the card socket corresponding to the hardware event is obtained in processing block 1103. If a card insertion event is detected, processing path 1107 is taken to processing block 1108 where the card insertion processing subfunction is activated for the newly installed card. Processing then terminates at return bubble 1131.

Referring again to decision block 1105, if a card has not been inserted into a socket, processing path 1109 is taken to decision block 1111. If a card removal event is detected, processing path 1115 is taken to processing block 1119 where the linked list of device drivers within device driver RAM area 505 is traversed in search of a device driver corresponding to the socket for the removed card. If the device driver corresponding to the removed card is found, processing path 1125 is taken to processing block 1127 where a card insertion flag in the device driver data is reset to indicate that the corresponding card has been removed. Once the card insertion flag for the removed card has been reset, the device driver corresponding to the removed card is activated in processing block 1129. Activation of the device driver corresponding to the removed card causes the device driver to gracefully terminate any ongoing activity while the card was installed and disables further access to the removed card. The device driver is then unlinked from the linked list of device drivers. Upon completion of processing block 1129, control is transferred back to processing block 1119 where the device driver linked list is again traversed for another device driver corresponding to the socket for which a card removal event was detected. The loop between processing blocks 1119 and 1129 continues for each device driver in the linked list until every device driver of the removed card is processed. When this occurs, processing path 1123 is taken to bubble 1131 where processing for card event servicing terminates.

Referring back to decision block 1111, if the hardware event causing the activation of card event service routine 1101, is neither a card insertion event nor a card removal event, processing path 1113 is taken to processing block 1117 where the unidentified event is recorded. Processing then terminates at bubble 1131.

Figure 10:
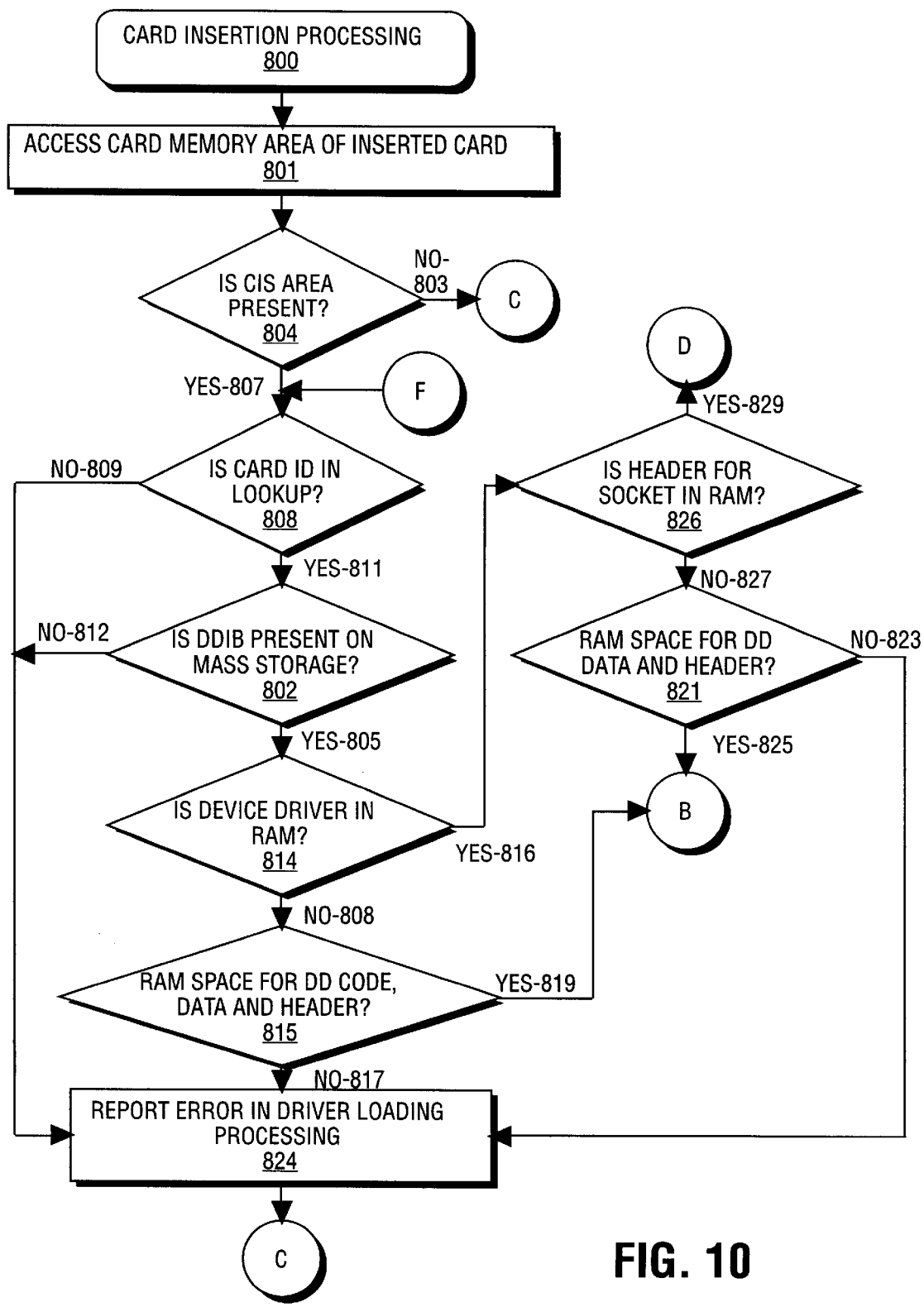

Referring now to FIG. 10, the card insertion processing subfunction 800 is illustrated. Card insertion processing 800 is activated either from processing block 715 illustrated in FIG. 7 or processing block 1108 illustrated in FIG. 9. Card insertion processing 800 is responsible for controlling the allocation and loading of a device driver corresponding to a newly inserted feature card. Starting at processing block 801, the card memory area of the newly inserted card is accessed. If a card information structure is present in the card memory area of the newly installed card, processing path 807 is taken to decision block 808. If no CIS is present in the card memory area, processing path 803 is taken to the bubble labeled C illustrated in FIG. 12 where card insertion processing terminates at bubble 1017. Because not all feature cards require a device driver, processing path 803 is provided for those cards that do not require a device driver.

At decision block 808, the device driver lookup table is searched to determine whether or not there is an entry in the lookup table for the card unique identifier of the newly inserted card. If there is no entry in the lookup table for the card, then processing path 809 is taken to processing block 824 where a driver loading error is reported. In the case where an error occurs, processing then continues to the bubble labeled C illustrated in FIG. 12 where processing terminates at bubble 1017.

Referring again to FIG. 10, if an entry is found in the lookup table for the inserted card in decision block 808, then processing continues along path 811 to decision block 802.

Figure 12:
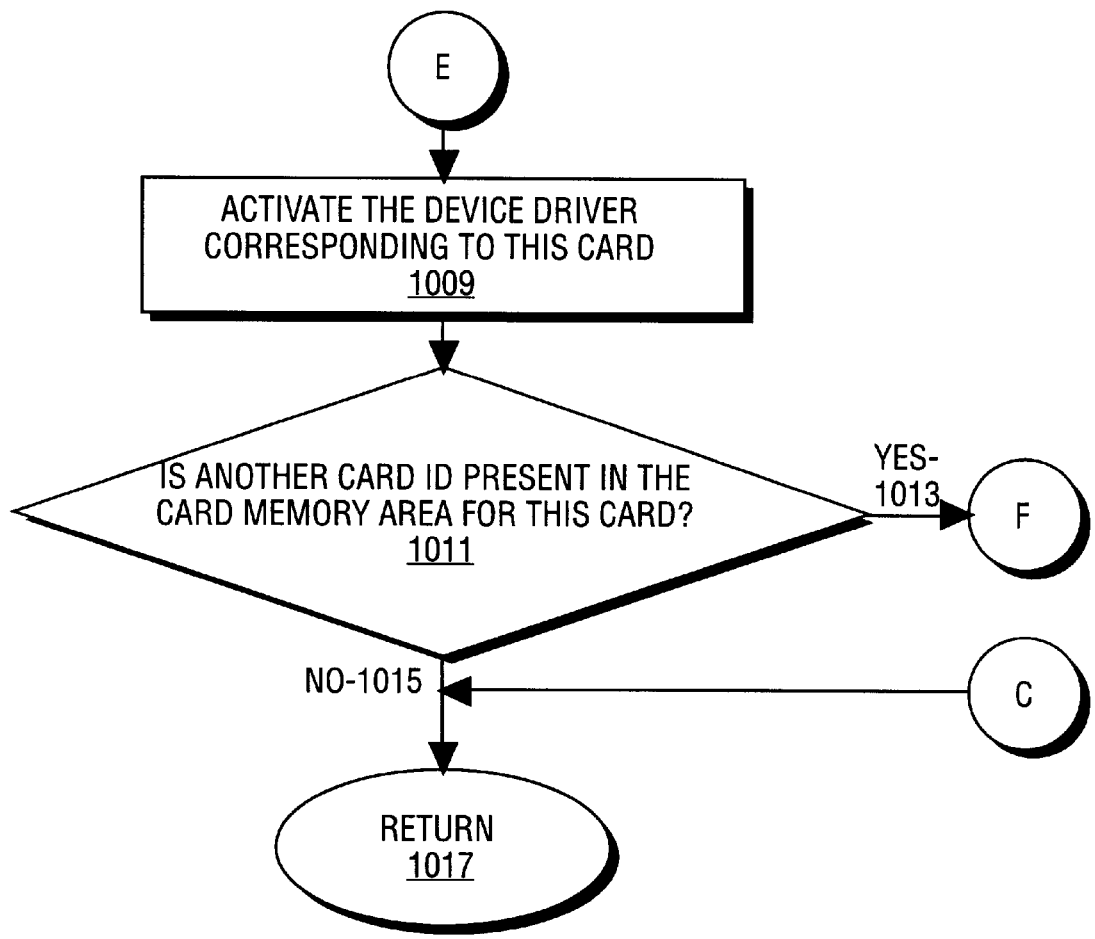

At decision block 802, the header of the device driver information block (DDIB) of the newly installed card is read from the mass storage device. If there is no DDIB for the inserted card present on the mass storage device, then processing path 812 is taken to processing block 824 where a driver loading error is reported. Card insertion processing then terminates through the bubble labeled C as illustrated in FIG. 12. If a DDIB for the inserted card is present on the mass storage device, then processing path 805 is taken to decision block 814.

Decision block 814 tests, based on the device driver unique identification, whether or not the device driver for the newly installed card has been previously loaded into RAM, and still resides there. If the device driver still resides there, then the device driver executable code does not need to be loaded again. Thus, if the device driver is already resident, processing path 816 is taken to decision block 826 where a test is made to determine whether the header for this socket resides in RAM. If the header is already in RAM, then it does not need to be loaded again, and processing path 827 is taken to bubble D as illustrated in FIG. 11.

Referring again to decision block 826 of FIG. 10, if the header has not been loaded into RAM, then it must be loaded there. Therefore, processing path 829 is taken to decision block 821 where available space within device driver RAM area 505 is checked. If there is available RAM space for the device driver data and the device driver header, processing path 825 is taken to the bubble labeled B as illustrated in FIG. 11. If, in decision block 821, it is determined that there is not enough RAM space available (i.e. insufficient system memory was set aside originally for device drivers), processing path 823 is taken to processing block 824 where an error in driver loading processing is reported. Card insertion processing then terminates through the bubble labeled C as illustrated in FIG. 12.

Referring again to decision block 814, if the device driver for the newly installed feature card does not reside in RAM, processing path 818 is taken to decision block 815. In decision block 815, a test is made to determine if there is enough space available in device driver RAM area 505 for the storage of the device driver executable code, the device driver data, and the device driver header. If enough RAM space is available, processing path 819 is taken to the bubble labeled B as illustrated in FIG. 11. If, however, as a result of the test made in decision block 815, it is determined that there is not enough RAM space available, processing path 817 is taken to processing block 824 where an error in driver loading processing is reported. Card insertion processing then terminates through the bubble labeled C as illustrated in FIG. 12.

Figure 11:
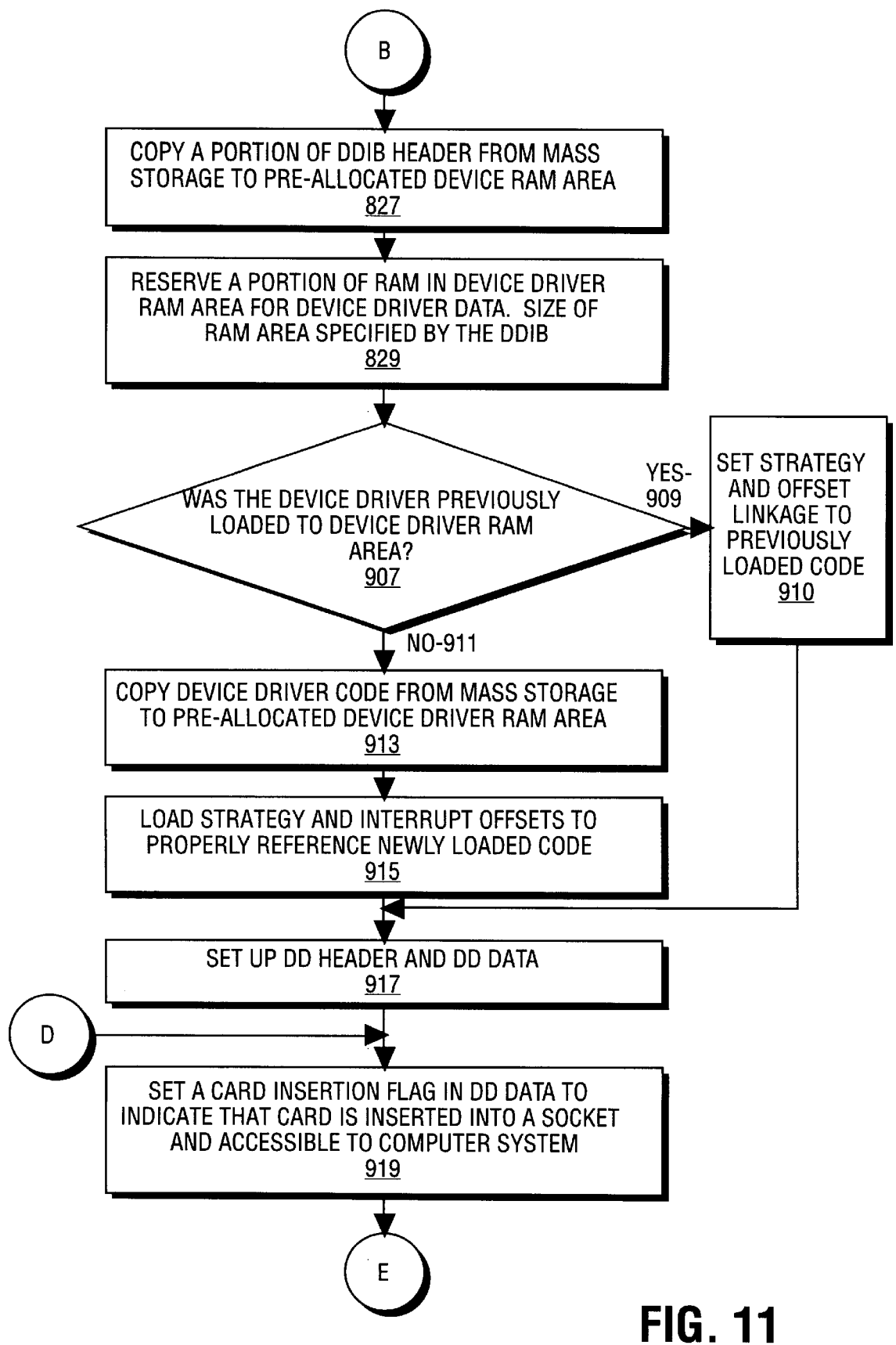

Referring now to FIG. 11, card insertion processing continues at the bubble labeled B. At this point, it has been determined that sufficient space is available in device driver RAM area 505 for the storage of the device driver for the newly inserted feature card. In processing block 827, a portion of the DDIB header from the mass storage device is copied into the preallocated device driver RAM area. In particular, fields 411, 413, 415, 417, and 419 of the DDIB header are copied into fields 630, 632, 634, 636, and 638 of the device driver header, respectively. An additional portion of RAM in the device driver RAM area is reserved for device driver data in processing block 829. The size of this data area is specified by a parameter 427 in the DDIB header.

If the device driver is not resident in the device driver RAM area 505, processing path 911 is taken to processing block 913. In processing block 913, the device driver executable code is copied from the mass storage device to the preallocated device driver RAM area 505. The strategy and interrupt offsets are loaded in processing block 915 to properly reference the newly loaded code. Referring back to decision block 907, if the device driver is resident in the proper device driver RAM area 505, processing path 909 is taken to processing block 910 where the strategy and offset linkage is set to the previously loaded executable code. In this manner, loading a previously loaded device driver will be prevented. Processing then continues at processing block 917.

At processing block 917, the device driver header area and device driver data area within device driver RAM area 505 are initialized. Initialization of these areas includes loading linkage pointers, the device driver unique identification, and adapter and socket identification information. The adapter and socket identification information is supplied by socket services. The other areas may be loaded by transferring the corresponding information from the mass storage device resident DDIB header. A card insertion flag in the device driver data is set in processing block 919 to indicate that the card is inserted into a socket and accessible to the computer system. Processing then continues at the bubble labeled E as illustrated in FIG. 12.

Referring now to FIG. 12, the device driver corresponding to the newly inserted card is activated in processing block 1009. As a result of the activation of the device driver, interrupt routing from the newly installed card into the system, input/output address mapping from the system to the card and/or memory mapping from the system to the card is enabled. Thus, the device driver provides a linkage between the computer system software and the card.

If another card ID for the card is present in mass storage device memory area, processing path 1013 is taken to the bubble labeled F as illustrated in FIG. 10 where the lookup for the subsequent card ID is performed in decision block 808. Because feature cards may contain more than one set of functionality, more than one device driver per card may be present. If, however, no other card ID is present for the newly installed card, processing path 1015 is taken to termination bubble 1017 where card insertion processing terminates.

Figure 13:
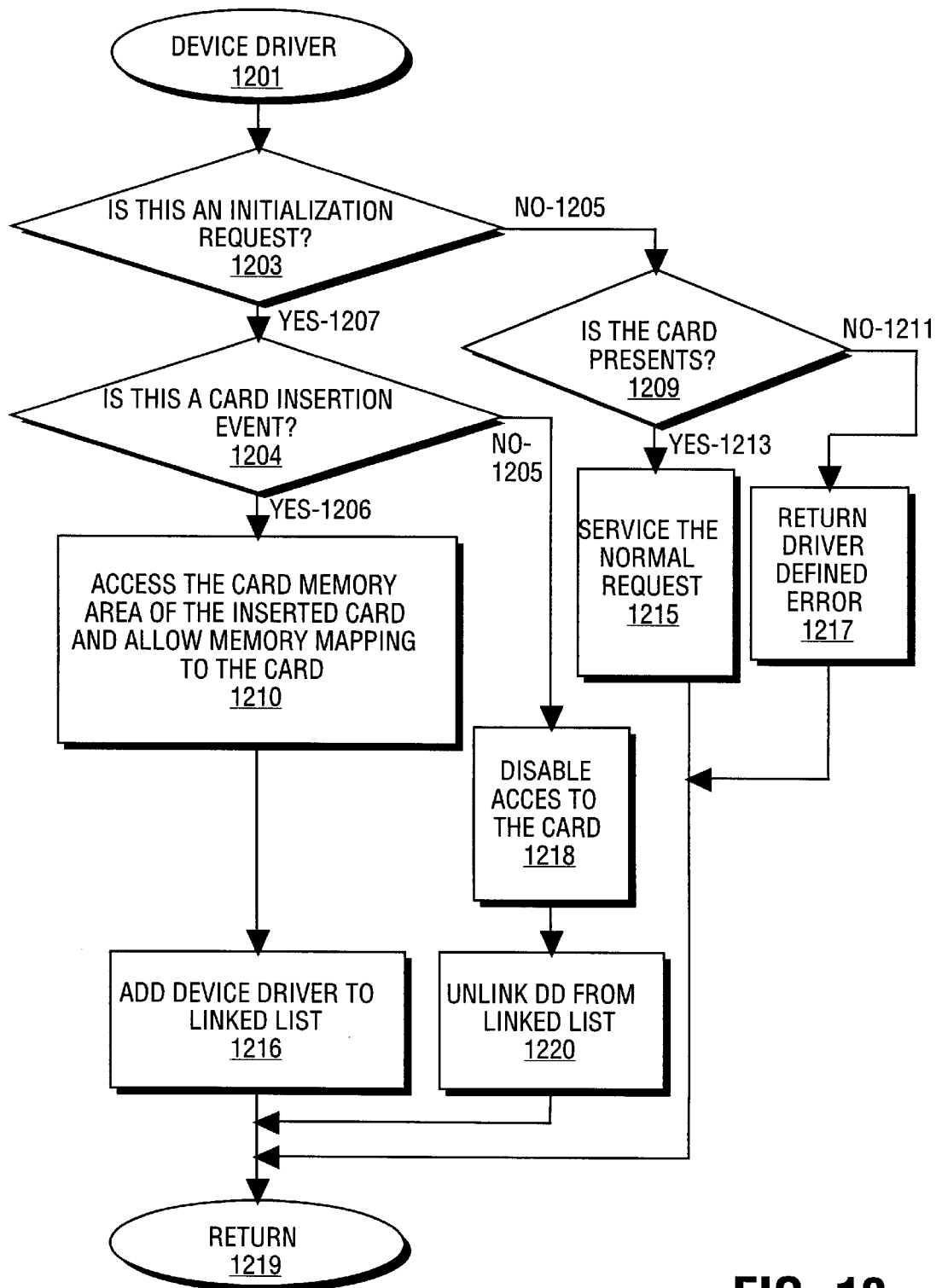

Referring now to FIG. 13, the processing logic for each device driver is illustrated starting at bubble 1201. The device driver processing logic is activated in response to a card insertion or removal event, as well as during a normal access to an inserted card. For example, device driver processing logic is executed in response to the activation of the device driver logic in processing block 1129 illustrated in FIG. 9 and in processing block 1009 illustrated in FIG. 12.

If the device driver is being activated in order to initialize the operation of the device driver after being loaded, processing path 1207 is taken to decision block 1204. If the activation of the device driver is the result of a card insertion event, processing path 1206 is taken to processing block 1210 where the card memory area of the inserted card is accessed. As a result of enabling access to the card, feature card functionality may be fully exploited. The newly installed device driver is added to the linked list of device drivers maintained by the operating system in processing block 1216. Adding the newly installed device driver to this linked list involves setting a pointer in the device driver header to point to the next device driver block in the linked list. Similarly, the device driver header pointer of the previous device driver block is set to point to the newly installed device driver.

Referring again to decision block 1204, if the device driver is not activated in response to a card insertion event, a card removal event is assumed. In this case, processing path 1205 is taken to processing block 1218 where access to the card is disabled in response to the removal of the card. Then, in processing block 1220, the device driver is unlinked from the linked list of device drivers. In this manner, computer system software is prevented from inadvertently attempting to access a removed card.

Referring back to decision block 1203, if the device driver is not activated for the purpose of initializing the device driver, processing path 1205 is taken to decision block 1209. Processing path 1205 is taken during the normal operation of the device driver after initialization has occurred. In this case, the presence of the card corresponding to the device driver is checked in processing block 1209. If the card has been removed, processing path 1211 is taken to processing block 1217 where a device driver defined error is returned and processing terminates at bubble 1219. If, however, the card corresponding to the device driver is still present and active, processing path 1213 is taken to processing block 1215 where a normal device driver request is serviced in a manner well known to those skilled in the art. Upon completion of the normal request in processing block 1215, processing terminates at bubble 1219.

Thus, a computer system having a method and apparatus for dynamically configuring device drivers of system resources stored on a mass storage device is described.

While the method of the present invention has been described in terms of its presently preferred and alternate embodiments, those skilled in the art will recognize that the method of the present invention may be practiced with modification and alternation within the spirit and scope of the appended claims. The specifications and drawings are, accordingly, to be regarded in an illustrative rather than a restrictive sense.

I claim:

1. In a computer system having a processor, a system memory, a mass storage memory device and an interface for receiving a removable system resource, a process for dynamically configuring device drivers of removable computer system resources, said process comprising the steps of:

configuring the system memory in a bootstrap initialization; and after said bootstrap initialization while an application program is running and prior to any subsequent bootstrap initialization, performing the following steps, (a) receiving a removable system resource at the interface;

(b) retrieving a device driver identifier from the removable system resource;

(c) copying a device driver corresponding to said device driver identifier from the mass storage memory device to the system memory; and (d) executing said device driver from the system memory.

2. The process as set forth in claim 1 wherein said mass storage memory device further includes a device driver information block (DDIB) header corresponding to said device driver identifier, said copying step further including the step of copying said DDIB header into the system memory.

3. The process as set forth in claim 1 further including the steps of:

storing said device driver on the mass storage memory device in a location corresponding to said device driver identifier; and updating a device driver lookup table such that, based on said device driver identifier, said device driver lookup table points to a location corresponding to said device driver stored on said mass storage memory device.

4. The process as set forth in claim 1 further including the step of displaying a message indicating that a removable system resource has been received at said interface.

5. The process as set forth in claim 1 further including the step of suspending execution of said application program while said steps of retrieving, copying, and executing are performed.

6. The process as set forth in claim 1 further including the step of retaining said device driver in system memory as long as the removable system resource is coupled to said interface.

7. The process as set forth in claim 1 further including the steps of:

receiving an indication if the removable system resource has been decoupled from the interface; and disabling access to said device driver.

8. The process as set forth in claim 1 wherein said configuring the system memory step occurs prior to bootstrap initialization.

9. The process as set forth in claim 1 wherein said configuring the system memory step occurs subsequent to bootstrap initialization.

10. The process as set forth in claim 1 further including a step of providing a resource memory in said removable system resource, said resource memory containing said device driver identifier.

11. In a computer system having a processor, a system memory, a mass storage memory device and an interface for receiving a removable system resource, an apparatus for dynamically configuring device drivers of removable computer system resources, said apparatus comprising:

(a) means for configuring the system memory in a bootstrap initialization;

(b) means for receiving a removable system resource at the interface;

(c) means for retrieving a device driver identifier from the removable system resource;

(d) means for copying a device driver corresponding to said device driver identifier from the mass storage memory device to the system memory; and (e) means for executing said device driver from the system memory, said elements (b) through (e) being operable after said bootstrap initialization while an application program is running and prior to any subsequent bootstrap initialization.

12. The apparatus as set forth in claim 11 wherein said mass storage memory device further includes a device driver information block (DDIB) header corresponding to said device driver identifier, said means for copying further including means for copying said DDIB header into the system memory.

13. The apparatus as set forth in claim 11 further including:

means for storing said device driver on the mass storage memory device in a location corresponding to said device driver identifier; and means for updating a device driver lookup table such that, based on said device driver identifier, said device driver lookup table points to a location corresponding to said device driver stored on said mass storage memory device.

14. The apparatus as set forth in claim 11 further including means for displaying a message indicating that a removable system resource has been received at said interface.

15. The apparatus as set forth in claim 11 further including means for suspending execution of said application program while said means for retrieving, said means for copying, and said means for executing are operating.

16. The apparatus as set forth in claim 11 further including means for retaining said device driver in system memory as long as the removable system resource is coupled to said interface.

17. The apparatus as set forth in claim 11 further including:

means for receiving an indication if the removable system resource has been decoupled from the interface; and means for disabling access to said device driver.

18. The apparatus as set forth in claim 11 wherein said means for configuring the system memory is operable prior to bootstrap initialization.

19. The apparatus as set forth in claim 11 wherein said means for configuring the system memory is operable subsequent to bootstrap initialization.

20. The apparatus as set forth in claim 11 further including a resource memory in said removable system resource, said resource memory containing said device driver identifier.

* * * * *